United States Patent [19]

Kretschmann

[11] Patent Number: 4,983,139

[45] Date of Patent: Jan. 8, 1991

[54] COVER FOR BEEHIVES

[76] Inventor: Theodore R. Kretschmann, 949 E. Laffayette St., Dadeville, Ala. 36853

[21] Appl. No.: 308,049

[22] Filed: Feb. 9, 1989

[51] Int. Cl.⁵ ............................................. A01K 47/00
[52] U.S. Cl. ......................................... 449/30; 449/15
[58] Field of Search .................. 449/3, 15, 26, 29, 30; 229/3.5 MF; 220/449

[56] References Cited

U.S. PATENT DOCUMENTS

| | | | |
|---|---|---|---|
| 83,388 | 10/1868 | Johnson | 449/30 |
| 1,871,595 | 8/1932 | Eldred | 449/30 |
| 3,438,070 | 4/1969 | Florance | 449/26 X |
| 3,883,907 | 1/1975 | Foxbower et al. | 449/29 |
| 4,230,924 | 10/1980 | Brastad et al. | 229/3.5 MF X |

Primary Examiner—Robert P. Swiatek
Attorney, Agent, or Firm—Jennings, Carter, Thompson & Veal

[57] ABSTRACT

A protective cover is removably placed over a beehive for overwintering and utilizes an inner reflective surface to return radiant energy to the hive and an outer non-reflective surface to absorb energy into the hive. The cover may have reclosable openings therein to allow inspection of the hives.

6 Claims, 2 Drawing Sheets

COVER FOR BEEHIVES

FIELD OF THE INVENTION

The present invention relates generally to the field of beekeeping and more particularly to the improvement of the rate of survivability of the bees in a hive during the winter months. In greater particularity the present invention relates to a cover for retaining heat in a hive during the winter months. More particularly the present invention may be described as a heat-retaining cover for said hive.

BACKGROUND OF THE INVENTION

A major factor in the continuity of a colony of bees in the ability of the bees to survive the winter temperatures. Hives are not generally insulated and are not normally moved into heated shelters during the winter months, thus the bees must make use of their natural abilities to survive. A single bee would die upon exposure to the winter colds; however, a colony of bees is able to cluster together and generate enough muscular energy to keep a substantial portion of the mass warm. By means of this constant movement and interchanging of position, the mass of bees enables a significant number of the bees to survive. However, a significant number of the bees also die due to the stress and cold.

In the aerospace industry and particularly in the field of space exploration, a number of lightweight, flexible materials have been developed which have been used to reflect radiant energy from sensitive components. Such materials have also found earthly uses such as tanning blankets and the like. These materials do not afford any insulation as might be afforded by an insulative batt, however they are able to redirect radiant energy impinging on their surfaces.

SUMMARY OF THE INVENTION

It is the object of the present invention to reduce the loss of bees inside a hive due to cold weather.

It is another object of the invention to promote better health in surviving bees within a hive who are subjected to cold winter temperatures.

Yet another object of the invention is to reduce the cost of replenishing worker bees in a hive that has suffered severe losses in overwintering.

Still another object of the invention is to reduce the spread of infectious diseases which may be introduced to the hive by replenishment with bees from outside sources.

All of these objects and advantages are accomplished by my product which assists the bees' natural survival techniques. Bees generate the heat necessary to survive cold winter weather by clustering. If the bees are not able to cluster tightly enough or if the weather is too sever, a number of bees, if not the entire colony, will be killed by the cold weather. Much of the energy generated by the clustering bees is shared by convection and conduction, however some of the energy is in the form of radiant energy. A part of the radiant energy is directed away from the cluster toward the walls of the hive where it is absorbed or reflected. Externally of the wall of the hive a portion of the energy is again reradiated. It is at this interface that I propose to help the bees by providing a sheath of reflective material about the hive. The reflective material will return the energy radiating from the hive to the hive and thus increase the temperature of the hive. In some instances it may be preferable to have a non-reflective outer sheathing bonded to the reflective material or have one side of the material as a non-reflecting surface. In such instances, radiant energy from external sources, such as the sun, would be absorbed by the material and reradiated from the internal surface into the hive. These two features thus introduce into the hive an amount of energy which was heretofore lost. Additionally, my sheath fits over the outside of the hive and, although not airtight, traps a layer of air about the hive which acts as an insulative layer. Accordingly I provide reradiant energy input and insulative energy retention.

BRIEF DESCRIPTION OF THE DRAWINGS

A hive cover embodying features of my invention is depicted in the accompanying drawings which form a portion of the present disclosure and wherein.

DESCRIPTION OF A PREFERRED EMBODIMENT

Figure 1:
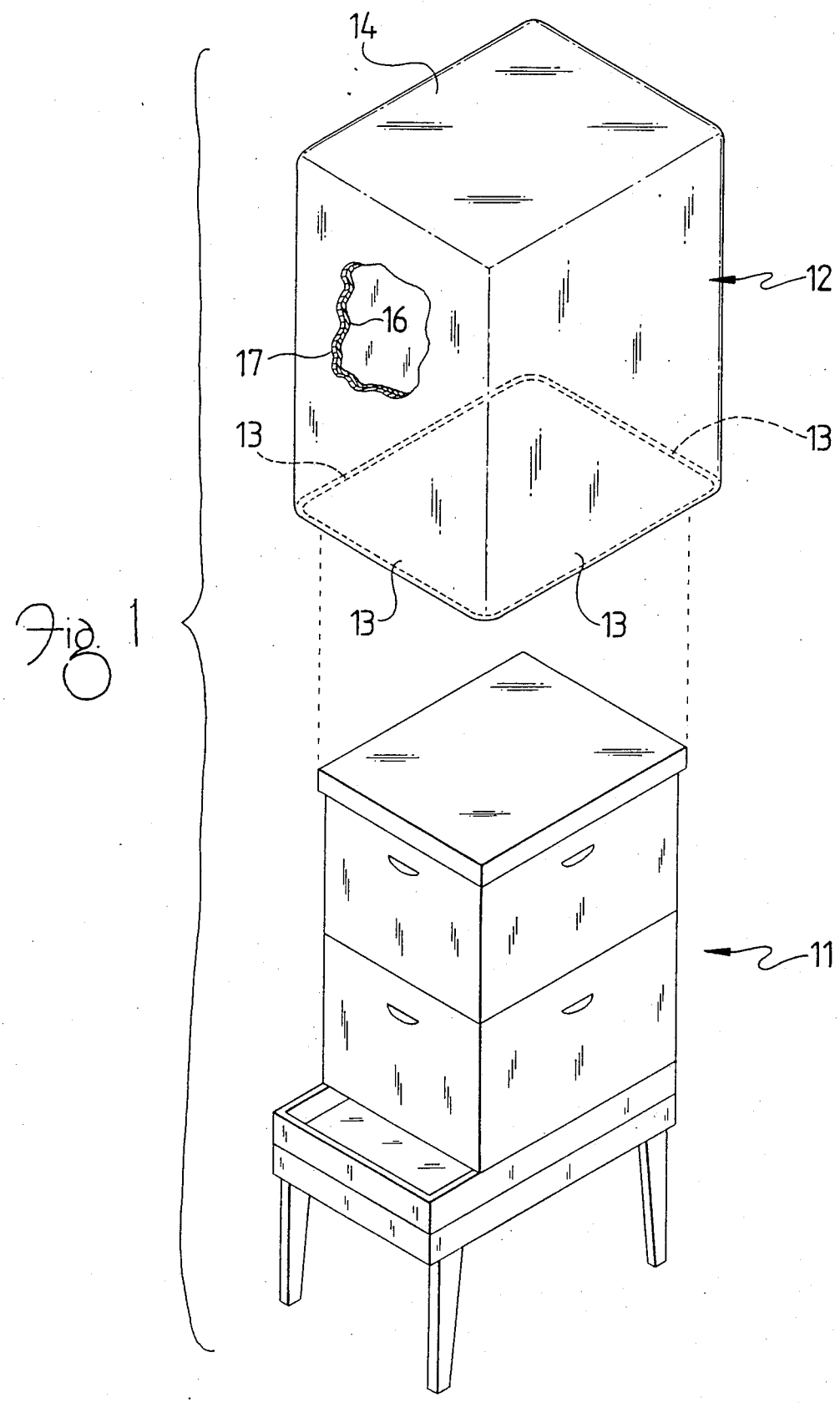
FIG. 1 is a perspective view showing my invention raised above an associated hive.
Figure 2:
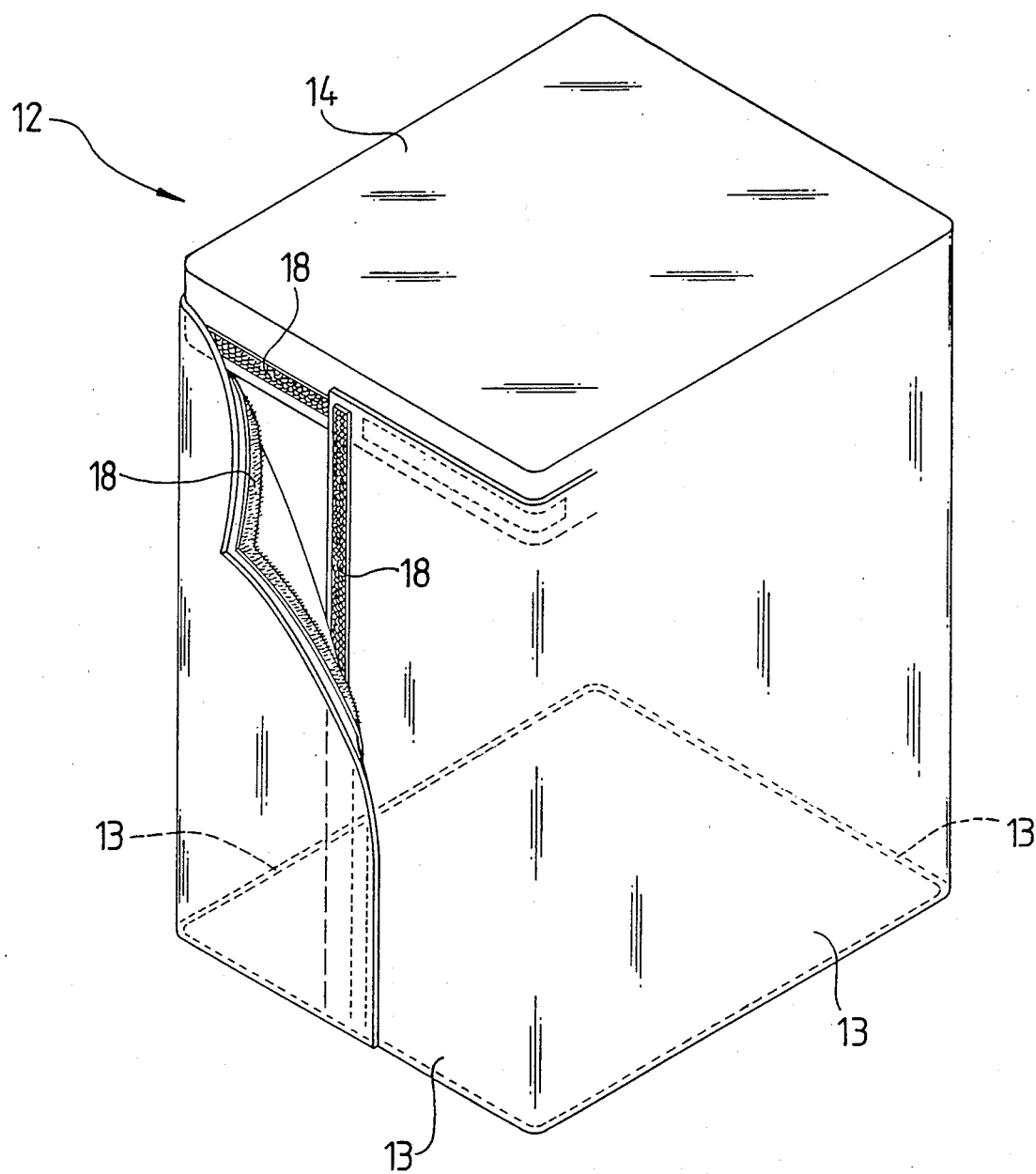
FIG. 2 is a perspective view showing my invention with a flap opening for hive examination.

Referring to the Drawings for a clearer understanding of the invention, it will be appreciated that in FIG. 1 the hive 11 is shown generally. Likewise, my protective cover 12 will have its exact dimensions determined by the size of the hive 11. Nonetheless, as may be seen in FIGS. 1 and 2, my cover 12 is essentially a sheath having a vertical wall 13 and a top portion 14 which is joined to enclose the hive 11 about its top and side portions. The vertical wall 13 and top 14 are depicted as a plurality of rectangular members in as much as conventional hives are rectangular. It will be appreciated that the top 14 may be circular and the walls 13 may form a cylinder without departing from the scope of the present invention.

In its most basic embodiment, my invention is in the form of a continuous sheath, as shown in FIG. 1, which simply slips over the top of the hive. The sheath may be made of woven polyethylene having light-reflective properties or may be made from a mono-layered film; however, in the preferred embodiment, the sheath will have an inner layer or surface 16 which reflects radiant energy and an outer layer or surface 17 which absorbs radiant energy. These surfaces will be in physical contact such that the majority of the absorbed energy is retransmitted into the hive.

In a second embodiment of the invention, the vertical wall 13 is split along the front of the hive 11 and a cooperative fastener 18, such as hook and pile fasteners, is attached to each edge of the split so that the wall 13 may be opened and closed. Likewise, the top edge of the wall 13 is similarly attached to the top portion 14 along the front of the hive 11 and over a portion of the sides of the hive 11. In this embodiment, the sheath may be opened to gain access to the hive to check the condition of the bees as may be done in early spring.

Note that in either embodiment the sheath should be flexible so that the walls 13 are generally co-planar with the hive walls and are easily positioned on and removed from the hive. The sheath 12 should fit closely about the hive 11, but should not be so snug as to be difficult to place on the hive. Therefore, it will be appreciated that a layer of air will remain between the hive 11 and sheath 12 and will thus provide a degree of insulation.

The foregoing embodiments thus provide a means for keeping the bee cluster warmer in winter months, yet allow the hives to be unmodified and thus undisturbed for their normal use in the temperate months.

While I have shown my invention in two forms, it will be obvious to those skilled in the art that it is not so limited but is susceptible of various changes and modifications without departing from the spirit thereof.

What I claim is:

1. A cover for retaining heat in a beehive during the winter months comprising:
   (a) a plurality of vertical, flexible wall members surrounding said hive in conforming engagement therewith; and
   (b) a flexible top member affixed to said wall members and resting atop said hive with said wall members and top members each having an energy reflecting layer facing inwardly toward said hive and exterior layer adapted to absorb radiant energy originating externally thereof.

2. A cover as defined in claim 1 wherein said top is at least partially detachable from at least one of said plurality of wall members providing access to the top of an enclosed beehive.

3. A cover as defined in claim 2 wherein at least one wall member has a reclosable vertical slit therein, providing access to said beehive.

4. A cover for a beehive comprising a top portion and a plurality of wall portions attached thereto and depending therefrom to surround said beehive in close fitting engagement with each of said top and wall portions having an inner flexible reflective layer and an outer flexible energy-absorbent layer.

5. A cover as defined in claim 4 wherein at least one wall portion has a vertical slit therein bordered by closure means for selectively opening and closing said slit for access to said beehive.

6. A cover as defined in claim 5 wherein said closure means comprises hook and pile fasteners cooperatively positioned along said slit for selective engagement thereacross.

* * * * *